United States Patent [19]

Jacoby

[11] Patent Number: 4,934,013
[45] Date of Patent: Jun. 19, 1990

[54] WIPER CLEARING DEVICE

[76] Inventor: John J. Jacoby, 1919 Paper Mill Rd., Huntingdon Valley, Pa. 19006

[21] Appl. No.: 406,309

[22] Filed: Sep. 12, 1989

[51] Int. Cl.⁵ .................. A47L 25/00; B60J 1/20; B60S 1/62
[52] U.S. Cl. .................. 15/250 R; 15/250.19; 15/246; 296/96.15
[58] Field of Search .................. 15/112, 113, 236.01, 15/236.02, 237–241, 236.07, 236.08, 250.05, 250 R, 250.16, 250.17, 250.19; 219/203; 4/581, 582, 583; 40/594, 595, 596; 296/95.15, 84.1; D12/182

[56] References Cited

U.S. PATENT DOCUMENTS

| RE. 32,218 | 7/1986 | Kunert | 219/203 |
|---|---|---|---|
| 1,017,081 | 2/1912 | Collins | 15/236.08 |
| 2,310,945 | 2/1943 | Eisenberg | 15/236.08 |
| 2,974,340 | 3/1961 | Kopczynski | 15/250 R |
| 3,124,811 | 3/1964 | Treacy | 4/583 |
| 3,315,387 | 4/1967 | Heuser | 40/595 |
| 3,546,825 | 12/1970 | Dale | 15/250 R |
| 3,613,318 | 10/1971 | Gianatasio | 15/250 R |
| 3,826,518 | 7/1974 | Hennig | 15/237 |
| 3,908,222 | 9/1975 | Scott | 15/250 R |
| 3,999,224 | 12/1976 | Kollsman | 4/583 |
| 4,373,130 | 2/1983 | Krasborn et al. | 219/203 |
| 4,425,677 | 1/1984 | Cox | 15/237 |
| 4,479,319 | 10/1984 | Erlich | 40/595 |
| 4,616,376 | 10/1986 | Paretskoi | 15/250 R |
| 4,685,168 | 8/1987 | Mastromoro | 15/250 R |

Primary Examiner—Harvey C. Hornsby
Assistant Examiner—Joseph S. Machuga

[57] ABSTRACT

A wiper clearing device (10,24) for removing debris and other foreign matter from a wiper (14). The device includes a series of angularly positioned obstructions (20, 22). In one variation the obstructions are projections (20) while in another variation the obstructions are created by depressions (22). The obstructions (20, 22) are arranged in a bird track like pattern which forms a barricade over which the wiper must pass. As the wiper passes over the barricade debris and other foreign matter is dislodged. Variations are disclosed in which the obstructions are made integral with the windshield or are adhesively secured to the windshield.

21 Claims, 2 Drawing Sheets

1

WIPER CLEARING DEVICE

BACKGROUND

1. Field of Invention

This invention relates to the clearing of wiper for windshields and other surfaces serviced by wipers.

2. Description of Prior Art

Heretofore vision was impaired by streaking caused by wipers carrying debris and other foreign matter pressed against the shield by the wiper which continued until the matter became dislodged by attrition or was removed manually, often under less than favorable weather and traffic or roadway conditions.

Prior devices such as spray nozzles and other means, although helpful do not strip the wiper of residual and other attaching foreign matter which can become lodged between the wiper and the shield. This causes streaking which distorts vision and can adversely affect the operators or viewers ability and disposition which can contribute to the cause of accidents while possibly damaging the wiper or the shield or both.

SUMMARY OF THE INVENTION

The device as illustrated in the accompanying drawing and described below is designed to dislodge and remove debris and other foreign matter from wipers of windshields. The device includes a series of harshly angled obstructions which remove debris and other foreign matter from the wiper of windshields as the wiper passes over it. The obstructions can be created by projections or depressions which can be either manufactured into the windshield during its construction as illustrated in the embodiment of FIGS. 2 and 3 or can be adhesively attached or bonded to the windshield as exemplified in the embodiments of FIGS. 4-6. The obstructions are divided into a first group of generally parallel members and a second group of generally parallel members. The second group of parallel members are spaced from and arranged generally perpendicular to said first group. This design which forms a bird-track like pattern creating a barricade over which the wiper passes thereby removing debris and other foreign matter from the wiper. This design also promotes drainage. Furthermore, the obstructions can be incorporated into a base member. This design as will be explained below adds additional stripping edges.

OBJECTS AND ADVANTAGES

Accordingly, several objects and advantages of my invention are to dislodge and remove debris and other foreign matter from wipers for windshields and other surfaces serviced by wipers for the purpose of maintaining a clear field of vision by improving the performance of wipers.

My invention is user friendly in that it makes no demand on the owner, operator or viewer, and is ecologically friendly because it uses no chemicals. It needs no maintenance and it is inexpensive and easy to apply to any surface serviced by a wiper to make viewing clearer and safer.

Further objects and advantages of my invention will become apparent from a consideration of the drawings and ensuing description of it.

DRAWING FIGURES

Figure 1:
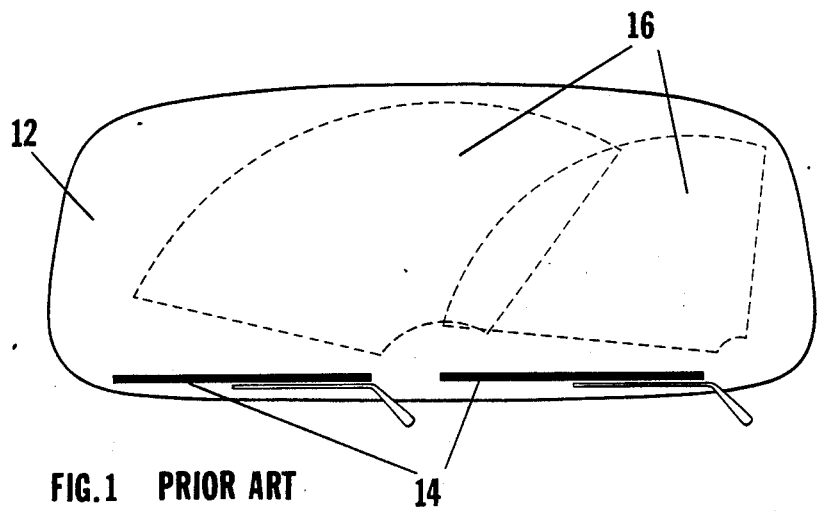
FIG. 1 illustrates a typical wiper and wiper pattern.

REFERENCE NUMERALS IN DRAWING 10 clearing field
12 windshield
14 wipers
16 wiper pattern
20 protrusions
22 depressions
6,8,28,30,36,38,40,42 rows of parallel obstructions
24 clean sweep strip
26 straitedge stripper
32 format
34 base
44 adhesive

DETAILED DESCRIPTION

Figure 2:
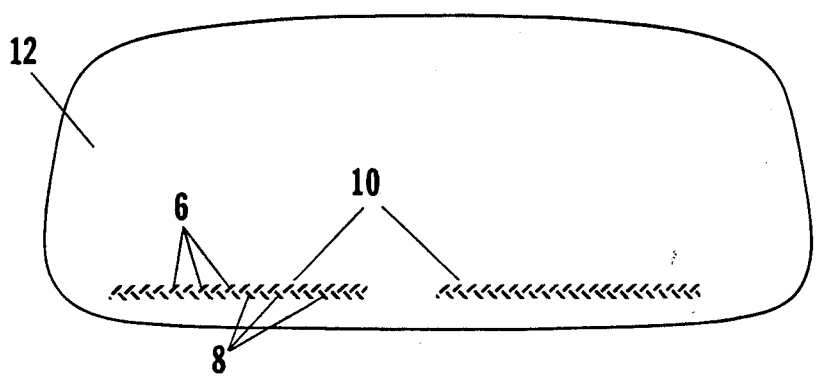
FIG. 2 illustrates one embodiment of the wiper clearing device formed integrally with the windshield.
Figure 3:
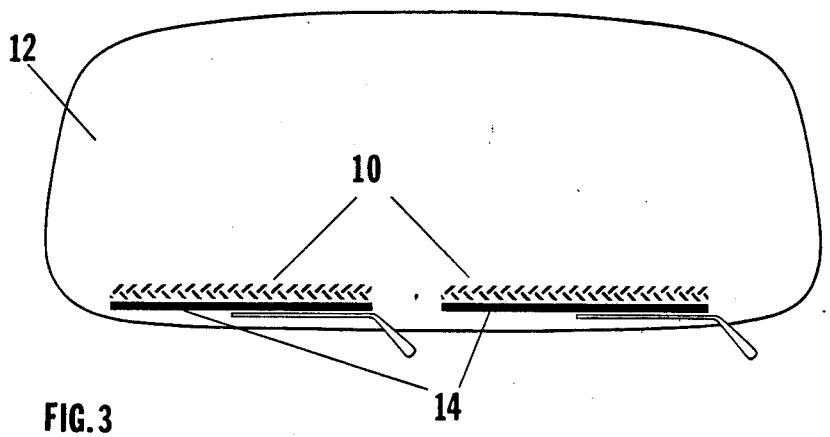
FIG. 3 illustrates the wiper clearing device formed integrally with the windshield and located above the wiper parked position.

The wiper clearing device of the present invention is illustrated in FIGS. 2-7. FIGS. 2 and 3 illustrate the wiper clearing device made integrally with the windshield and is called a clearing field. FIGS. 4-7 illustrates a variation of the device of FIGS. 2 and 3 in which the device is adhesively secured to or otherwise bonded to a windshield and is called a clean sweep strip.

In the embodiment of FIGS. 2 and 3 the clearing device (10) comprises a series of harshly angled obstructions (6,8) which are manufactured into the windshield (14). The obstructions can be either projections or depressions which are arranged in a bird-track like pattern, forming a barricade. This pattern includes a first set of generally parallel obstructions (6) and a second set of generally parallel obstructions (8). The second set of generally parallel obstructions are spaced from said first set and are arranged generally perpendicular thereto, thereby promoting drainage. The clearing device is preferably located near the bottom of the windshield, as illustrated in FIG. 2. It is also preferably located just above the wiper (14), when the wiper is located in the parked position, as illustrated in FIG. 3. This causes the wiper to contact the clearing device before the wiper sweeps the windshield and not again until the wiper returns to the parked position.

In the embodiments of the invention represented by FIGS. 4-7 the clearing device is adhesively secured to or otherwise bonded to an existing windshield such as that illustrated in FIG. 1 rather than incorporated into the windshield during its construction.

Figure 4:
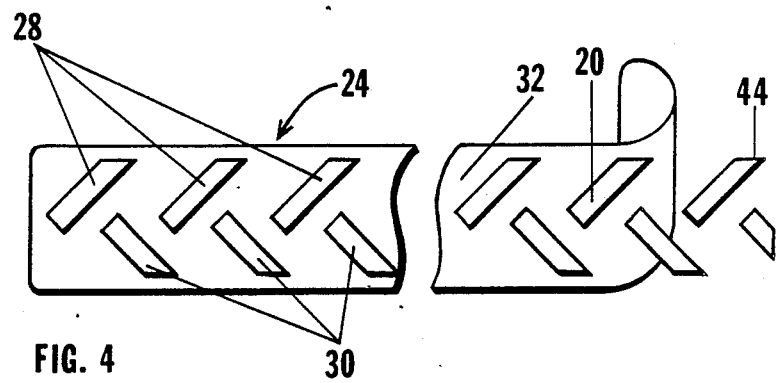
FIG. 4 illustrates a perspective view of another embodiment of the invention.

FIG. 4 illustrates another variation of the invention. In this embodiment the clearing device (24) is constructed of hard and durable material. The device includes harshly angled projections (20) arranged in a bird track like pattern which includes a first sets of generally parallel projections (28) and a second set of generally parallel projections (30) with the second set of projections being spaced from and generally perpendicular to said first set. However in this variation the projections are adhesively secured to an existing windshield rather than made integral therewith. For this pressure sensitive adhesive or other bonding application is located on the lower side of the projections. The lower format material (32) is removed after the barricade of projections is applied to the windshield. This design gives the appearance that the clearing device is manufactured into the surface of the windshield as in the previous embodiment.

Figure 5:
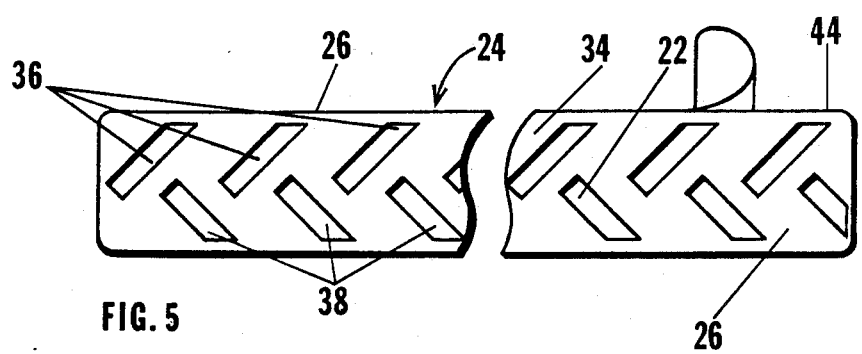
FIG. 5 illustrates a perspective view of further embodiment of the invention.

FIG. 5 illustrates another variation of the invention. The clearing device (24) in this figure is also constructed of hard and durable material. The device includes a base member (34) having straight edges (26) along the strips long side. The straight edges of the base member function as a stripper to clear both sides of the wiper. The base has adhesive on its lower surface which is pressure sensitive adhesive or a similar application which secures the device to an existing windshield. In this embodiment depressions (22) are formed in the base member. The depressions like the projection of the previous embodiments form a bird track like pattern having a first set of generally parallel depressions (36) and a second set of generally parallel depressions (38) with the first and second sets of depressions being spaced apart and generally perpendicular to each other.

Figure 6:
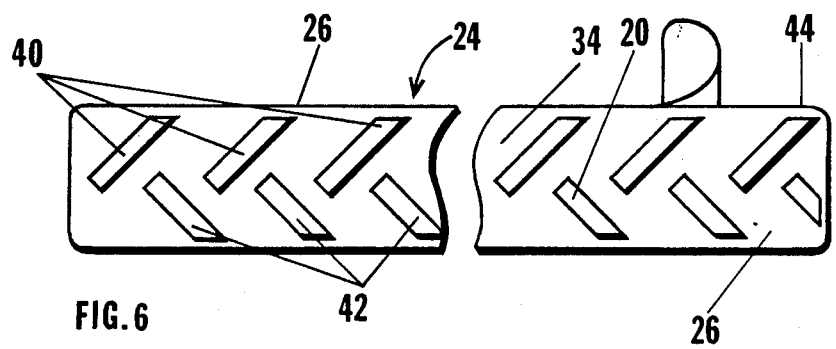
FIG. 6 illustrates a perspective view of another embodiment of the invention.
Figure 7:
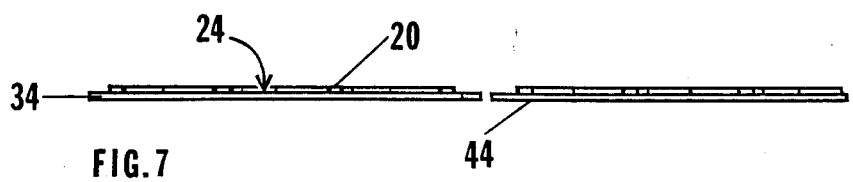
FIG. 7 illustrates a side view of the wiper clearing device of FIG. 6.

Another variation of the invention is illustrated in FIGS. 6 and 7. The clearing device is represented by reference numeral (24). The device is constructed of hard durable material and includes a base member (34) having straight edges (26) along the strips long side. The straight edges as in the previous embodiment function as a scraper to clear both sides of the wiper. The base has adhesive (44) on its lower surface, which is preferably pressure sensitive type or other bonding material. On the bases upper surface are a plurality of harshly angled projections (20). The projections may be superimposed onto or drawn from the base strip material. The projections as in the previous embodiments are divided into a first set of generally parallel projections (40) and a second set of generally parallel projections (42) with the second set being spaced from and generally perpendicular to said first set, thereby promoting drainage. This device along with the other aforementioned clean sweep strips has a thickness apprroximately equal to that of the wiping edge of the wiper and displaces approximately the same surface area as does the body of the wiper.

OPERATION OF INVENTION

Debris and other foreign matter is dislodged and removed from the windshield (12) and the wiper (14) when the wiper passes over the clearing field (10) where the wiper is raked and stripped of said vision impairment matter.

The clean sweep strip (24) is applied to the windshield in lieu of a clearing field embodied into the windshield manufacturing process to perform the same function as described above.

Preferred location for the clearing field or application of the clean sweep strip is low on the windshield just above the wipers when parked. This causes wiper clearing contact before the wiper sweeps the windshield and not again until returning to its parked position, if possible.

Because all wipers and surfaces serviced by wipers are not exactly alike, some operate from overhead, for example, and outdoor climate conditions vary widely, the clearing field or clean sweep strip might be more effectively located elsewhere in the sweep of the wiper than as illustrated or described herein provided such location is prudent and does not interfere with a normal field of vision any more than the parked wipers interfere.

Most stubborn debris and other foreign matter can usually be dislodged and removed from the wiper by engaging and then disengaging the wiper action causing the wiper to lift or move from its parked position to pass over the clearing field and then again pass over the clearing field before returning to park even momentarily before resuming its continuous sweeping action, if desired.

The clean sweep strip barricade of debris clearing protrusion blocks (20) in a bird track like pattern provides passageways for drainage of foreign matter while clearing both sides as well as the wiping edge of the wiper as the wiper passes over its clearing field whether manufactured into or superimposed onto the windshield or other surface serviced by a wiper.

SUMMARY, RAMIFICATIONS AND SCOPE

Thus the reader will see that the service of this invention is not only effective in contributing to the maintainance of a clearer field of vision but also is inexpensive, having no moving parts and requiring no maintenance. The invention is user friendly in that it is silent and makes no demand on the owner, operator or viewer, and uses no chemicals. It is easy to apply to an existing windshield or other surface serviced by a wiper to make viewing safer and clearer.

While my above description contains many specificities, these should not be construed as limitations on the scope of the invention, but rather as an exemplification of one preferred embodiment thereof. Many other variations are possible.

For example, existing windows that are washed manually require the worker to clear the wiper frequently by passing the wiper through a chamois or other towel like material to clear the wiper for the next pass. A clearing field manufactured into the window or a clean sweep strip applied adjacent to if not directly on the window might help to make the task less arduous.

Other possibilities abound everywhere that surfaces serviced by wipers are to be found, such as in farm machinery, plant equipment, control towers, aircraft, marine and military. For some applications color or the absence of color might be advantageous, while in others a reflective clean sweep strip might improve visibility for safety.

Accordingly, the scope of the invention should be determined not by the embodiment(s) illustrated, but by the appended claims and their legal equivalents.

I claim:

1. A wiper clearing device for removing debris from the surface of a wiper of a windshield comprising a generally planar base member having an upper surface, a lower surface, and side surfaces, said lower surface of said base member having adhesive means thereon for attachment to said windshield, said upper surface having a plurality of elongated scraping projections extending therefrom adapted to remove debris from the surface of the wiper, said elongated projections being arranged in at least two groups, one of said groups having a series of generally parallel elongated projections and the other of said groups also having a series of generally parallel elongated projections, said projections of said one group being spaced from and arranged generally perpendicular to said projections of said other group so as to provide passageways for drainage.

2. The wiper clearing device of claim 1 wherein said adhesive means is pressure sensitive adhesive.

3. The wiper clearing device of claim 1 wherein the cross sectional area of said upper surface is approximately equal to the cross sectional area of the wiper.

4. The wiper clearing device of claim 1 wherein the base member and projections are made of a hard durable material.

5. The wiper clearing device of claim 1 wherein at least one edge of said base member forms a scraping edge for removing debris from said wiper.

6. The wiper clearing device of claim 1 wherein the device is attached to said windshield at a location within the sweep of the wiper.

7. The wiper blade clearing device of claim 1 wherein the device is located beneath the wiper when the wiper is in a parked position such that the wiper rests on the upper surface of the device.

8. A wiper clearing device for removing debris from a wiper of a windshield comprising a generally planar base member having an upper surface, a lower surface and side surfaces, said lower surface having attached thereto adhesive means for securing said device to a windshield, said upper surface have a plurality of elongated depressions adapted to remove debris from the surface of said wiper, said elongated depressions being arranged in at least two groups, one of said groups having a series of generally parallel elongated depressions and said other group also having a series of generally parallel elongated depressions, said depressions of said one group being spaced from and generally perpendicular to said depressions of said other group.

9. The wiper clearing device of claim 8 wherein the device is made of a hard durable material.

10. The wiper clearing device of claim 8 wherein at least one side of said base member forms a scraping edge for said wiper.

11. The wiper clearing device of claim 8 wherein said adhesive means is pressure sensitive adhesive.

12. The wiper clearing device of claim 8 wherein the cross sectional area of said upper surface is approximately equal to the cross sectional area of said wiper.

13. The wiper device of claim 8 wherein the device is located on said windshield in a location within the sweep of the wiper.

14. The wiper clearing device of claim 23 wherein the device is located beneath said wiper when said wiper is in the parked position such that said wiper rests on the upper surface of said device.

15. A wiper clearing device for removing debris from the surface of a wiper of a windshield comprising a generally planar base member, said base member having an upper and lower surface, said upper surface has a plurality of elongated projections, said plurality of elongated projections are arranged into at least two groups, one of said groups containing a series of generally parallel elongated projections and the other group containing a series of generally parallel elongated projections, said one group of projections being spaced from and generally perpendicular to said other group, wherein said lower surface of said projections have adhesive means thereon for attachment to said windshield and said base member is releasably attached to said projections.

16. The wiper clearing device of claim 15 wherein the device is made of a hard durable material.

17. The wiper clearing device of claim 15 wherein said adhesive means is pressure sensitive adhesive.

18. The wiper clearing device of claim 15 wherein the cross sectional area of said upper surface of the device is approximately equal to the cross sectional area of said wiper.

19. The wiper of claim 15 wherein the device is located on the windshield in a location within the sweep of the wiper.

20. The wiper clearing device of claim 15 wherein the device is located beneath said wiper when said wiper is in the parked position such that said wiper rests on the upper surface of said device.

21. A windshield having a front and back surfaces, said front surface having an upper and lower region, said lower region of said front surface having means for removing debris from the surface of a wiper servicing said windshield, said means including a plurality of elongated scraping projections extending outwardly from said front surface, said elongated projections being arranged in at least two groups, one of said groups having a series of generally parallel elongated projections and the other of said groups also having a series of generally parallel elongated projection, said projections of said one group being spaced from and arranged generally perpendicular to said projections of said other group so as to provide passage for drainage.

* * * * *